United States Patent
Järger et al.

(10) Patent No.: US 9,167,865 B2
(45) Date of Patent: Oct. 27, 2015

(54) THERMOPLASTIC REINFORCEMENT MATERIALS

(75) Inventors: Henriette Järger, Heuchelhein (DE); Michael Deilecke, Jockgrim (DE)

(73) Assignee: Rhenoflex GMBH, Ludwigshafen (DE)

( * ) Notice: Subject to any disclaimer, the term of this patent is extended or adjusted under 35 U.S.C. 154(b) by 0 days.

(21) Appl. No.: 13/318,728

(22) PCT Filed: Apr. 24, 2010

(86) PCT No.: PCT/EP2010/002536
§ 371 (c)(1),
(2), (4) Date: Nov. 3, 2011

(87) PCT Pub. No.: WO2010/127781
PCT Pub. Date: Nov. 11, 2010

(65) Prior Publication Data
US 2012/0053269 A1    Mar. 1, 2012

(30) Foreign Application Priority Data
May 5, 2009   (DE) .......................... 10 2009 020 036

(51) Int. Cl.
| C09J 197/02 | (2006.01) |
| C09J 167/04 | (2006.01) |
| C09J 175/04 | (2006.01) |
| C09J 123/12 | (2006.01) |
| A43B 13/04  | (2006.01) |
| A43B 13/38  | (2006.01) |
| A43B 23/16  | (2006.01) |
| C09J 11/08  | (2006.01) |
| C08K 7/02   | (2006.01) |

(52) U.S. Cl.
CPC ............... *A43B 13/04* (2013.01); *A43B 13/38* (2013.01); *A43B 23/16* (2013.01); *C09J 11/08* (2013.01); *C08K 7/02* (2013.01)

(58) Field of Classification Search
CPC ...... C09J 197/02; C09J 167/04; C09J 175/04; C09J 12/02
USPC ................................................ 524/9; 428/323
See application file for complete search history.

(56) References Cited

U.S. PATENT DOCUMENTS

| 7,786,193 B2 | 8/2010 | Wilding et al. |
| 2006/0154047 A1 * | 7/2006 | Wilding et al. ............... 428/323 |

FOREIGN PATENT DOCUMENTS

| DE | 26 21 195      | 11/1977 |
| EP | 0 183 192      | 6/1986  |
| EP | 1 525 284      | 6/2007  |
| FR | 2 515 706      | 5/1983  |
| WO | WO-00/41585    | 7/2000  |
| WO | WO-00/53416    | 9/2000  |
| WO | WO-2004/090061 | 10/2004 |

* cited by examiner

*Primary Examiner* — James J Seidleck
*Assistant Examiner* — Deve E Valdez
(74) *Attorney, Agent, or Firm* — Venable LLP; Keith G. Haddaway; Annette K. Kwok

(57) ABSTRACT

The present invention relates to novel thermoplastic reinforcement materials, particularly for the shoe industry, and a method for the production thereof. The novel thermoplastic reinforcement materials are obtained by a preliminary production step of pre-agglomeration of plant fiber filler materials and thermoplastic hot-melt adhesives, so-called filler-plastic compounds, allowing filler material originating from very inexpensive, naturally occurring plant fibers of varying origins to be used, but in an amount up to 65% by weight, without losing the required material properties, such as strength under heat, good flexural rigidity, and surface adhesion.

7 Claims, No Drawings

THERMOPLASTIC REINFORCEMENT MATERIALS

This invention concerns new types of thermoplastic stiffening materials, in particular for the shoe industry, as well as a technique for manufacturing them.

Stiffening materials for the shoe industry particularly not only include front and rear caps, but also insoles, side stiffening, heel linings or slip straps. They have been used in the shoe industry for a long time in the form of machine-produced synthetic parts containing a filler that are glued with the upper material (such as leather) and the lining material (such as leather or textile material) through warmth and the effect of pressure and are adapted to the shape of the shoe last.

There are various state-of-the-art stiffening materials known.

DE 26 21 195 C describes stiffening materials that are manufactured in the form of flat materials/slabs where a carrier material is layered with a powder-formed meltable plastic material that also contains filling materials. Polyethylene, vinyl acetate and their copolymers are specified among the meltable plastics; filling materials are wood dust or powdered chalk. The idea behind this invention was to increase the proportion of filling materials in the coating while maintaining the material strength. They discovered that it is possible to boost the proportion of filling materials to approximately 50% if the granular distribution of the plastic and filling material powder is similar. This means that the melting plastic particles surround the filling material particles entirely so that they act like plastics. Generally, these mixtures do not have sufficient adhesive characteristics so that they also have to have a hot-melt adhesive coating to permanently glue them to the shoe's shaft material.

EP 183 192 B2 describes a shoe stiffening material that can be directly glued. What is known as a hot-melting adhesive, an epsilon polycaprolacton, is used as a bonding agent due to its low melting point of approximately 60° C. Furthermore, the filling materials consist of plastic powders or organic or inorganic powders sheaved with plastic that do not dissolve in the bonding agent, but adhere to it firmly. The ratio of the bonding agent to the filling material is 70-20 weight-% of the bonding agent to 30-80 weight % of filling material and the filling material has to have a granulation of 50-500 μm.

Other stiffening materials are described in WO 00/41585 A1 and WO 00/53416.

The disadvantage of all of these materials is the fact that it is necessary to use a textile or non-textile carrier material to give the bond the strength needed when manufacturing the compound shoe on machines when heated. It is not possible to return the waste that emerges when stamping out the components from the flat track and when sharpening (thinning out the edges) into the manufacturing process.

EP 1 525 284 B1 describes a special hot-melt adhesive/filling material mixture that has an MFI value (measured at 100° C., 21.6 kg in conformity with DIN ISO 1133) of 2-6 (preferably 3-5 cm$^3$/10 min.) which would give it sufficient internal stability to be processed without a carrier. For this purpose, the hot-melt adhesive has to have an MFR value (measured at 100° C., under 21.6 kg in conformity with DIN ISO 1133) of 2-300 (preferably 10-30 cm$^3$/10 min.) while the ratio of bonding agents to filling materials should be 50-95 weight-% of bonding agent to 50-5 weight-% of filling materials where the filling materials should have spherical multi-edged particles with a granulation of 10-500 μm.

Furthermore, the compound/mixture has to have a tack (measured in conformity with DIN EN 14510 at 65° C.) of at least 10 N-60 N (preferably 15-30 N). Furthermore, it is necessary that the conglutination (peel-resistance measured in conformity with DIN 53357) against the upper material is at least 30 N/5 cm and the longitudinal extension is a maximum of 25% after storing for 5 min. in the heat cabinet at temperatures of 90° C.

The waste of these materials has the same composition as the initial materials which means that they can be reused without any problems. The downside of these materials is the comparably high proportion of bonding agents since these products are no longer bonded strongly enough if there are higher proportions of filling materials, fall apart in the longitudinal direction at higher temperatures and become brittle after cooling or solidifying.

Therefore, the problem was finding a mixture or a technique that has sufficient bending strength, i.e. longitudinal strength/longitudinal extension and good tack, as well as peel-resistance, even at higher proportions of filling materials. Furthermore, the job was finding naturally regenerative raw materials, in particular of plant origin, that can be used in greater quantities, i.e. up to 65 weight-% with reference to the proportion of adhesive, without the finished thermoplastic stiffening material falling apart when processing and working in, especially in heat.

Surprisingly, this invention was capable of solving the aforementioned problem. Surprisingly, it was possible to maintain it with an outsourced production step in pre-agglomeration of plant fibre filling materials and thermoplastic hot-melt adhesives known as filling material plastic compounds, which make it possible in extruding for the filling materials to be used from very low-price and naturally available plant fibres of varying origins, but also at a quantity of as much as 65 weight-% without losing the needed material properties (such as stability in heat, good bending strength and tack). On the contrary, they evidence them extensively which is why they were particularly well-suited for the desired purpose. The plant fibre filling materials, straw fibres such as rice straw fibres or wheat straw fibres, have a characteristic length of 1-30 mm where they are preferably used at a length of 3-10 mm.

Proportions of filling materials in excess of 65 weight-% often no longer guarantee sufficient mixture in the kneaders or materials develop that are not stable. In other words, they can fall apart or can expand at higher temperatures, which means they can no longer be processed. All naturally regenerative plant fibres in the form of agglomerates are suited as filling materials if they can be easily processed in the extruder to flat tracks or foils under heat and pressure with the appropriate proportions of thermoplastic hot-melt adhesives. These tracks or foils can then be stamped into form parts in stamping machines and used as such in shoe production.

The plant fibres are gained by shredding or grinding from straw and they only contain slight quantities of moisture so that they can be used without added drying. It is known that these plant fibres can be used as animal litter. They frequently contain calcium carbonate in the form of calcium carbonate/lime, chalk. This combination can also be used profitably with the plant fibres from the invention, in particular with reference to the bending strength of the final product.

The technique for manufacturing the pre-agglomerate for the invention is carried out in a PFV Model Plast Agglomerator from Pallmann for example. The plant fibres (for instance, the straw bales) are pre-crushed (shredded) in it and transferred into a metering tank with an agitator. All of the material components are fed to the extruder from storage silos through a continuous turbomixing worm. The plant fibres/straw fibres fed and the thermoplastic hot-melt adhesives are agglomerated through friction heat just below the melting point of each of the hot-melt adhesives while suctioning off moisture or any gases developing. The compounds produced in this fashion can be processed with suitable extruders, flat presses or calenders or in trackware and slabs in the injection melding technique. The advantage of this technique is the fact that it is not necessary to pre-dry the plant fibre filling materials, for instance, the bales of straw. They can be processed without any problems at as much as 15 weight-% of moisture so that the finished compound only has up to 1% of moisture.

The difference to the technique in accordance with EP 1 525 284 B1 is the fact that the pre-agglomeration of the components of the compound in this invention (i.e., the plant fibre filling materials and thermoplastic hot-melt adhesives) makes it possible to work in the extruder immediately. This makes it possible to have a product that is stable and has particular bending strength with a very high quantity proportion of plant fibre filling materials while extensively retaining the properties described by the parameters in EP 1 525 284 B1. This bending strength and the very high proportion of filling materials cannot be brought about by the technique of EP 1 525 284 B1.

The following examples illustrate the invention in greater detail. The findings of the experiment are summarized in Table 1.

Examples 1-7 are from the invention while V1-V3 are comparative examples.

1.
35 weight-% of thermoplastic polyurethane with an MFI value of 1-25 g/10 min., measured at 150° C., 10 kg, 10 weight-% of ethylene vinyl acetate copolymer at a VA content of 20-40 weight-% and 10 weight-% of linear polyester polyepsilon caprolacton with a molecular weight distribution of 40 to 80,000 are pre-agglomerated with 40 weight-% of straw pellets at a bulk density of approximately 250 kg/m$^3$, a residual moisture of less than 9% and a fine component of less than 2% and then further processed in the extruder.

2.
10 weight-% of thermoplastic polyurethane with an MFI value of 1-25 g/10 min. measured at 150° C., 10 kg, 10 weight-% of ethylene vinyl acetate copolymer at a VA content of 20-40 weight-% and 30 weight-% of linear polyester polyepsilon caprolacton with a molecular weight distribution of 40 to 80,000 are pre-agglomerated with 50 weight-% of straw pellets at a bulk density of approximately 250 kg/m$^3$, a residual moisture of less than 9% and a fine component of less than 2% and then further processed in the extruder.

3.
35 weight-% of thermoplastic polyurethane with an MFI value of 1-25 g/10 min. measured at 150° C., 10 kg, 10 weight-% of ethylene vinyl acetate copolymer at a VA content of 20-40 weight-% and 15 weight-% of linear polyester polyepsilon caprolacton with a molecular weight distribution of 40 to 80,000 are pre-agglomerated with 40 weight-% of straw pellets at a bulk density of approximately 250 kg/m$^3$, a residual moisture of less than 9% and a fine component of less than 2% and then further processed in the extruder.

4.
10 weight-% of ethylene vinyl acetate copolymer at a VA content of 20-40 weight-% and 40 weight-% of linear polyester polyepsilon caprolacton with a molecular weight distribution of 40 to 80,000 are pre-agglomerated with 50 weight-% of straw pellet granulate at a bulk density of approximately 250 kg/m$^3$, a residual moisture of less than 9% and a fine component of less than 2% and then further processed in the extruder.

5.
20 weight-% of ethylene vinyl acetate copolymer at a VA content of 20-40 weight-% and 20 weight-% of linear polyester polyepsilon caprolacton with a molecular weight distribution of 40 to 80,000 are pre-agglomerated with 60 weight-% of straw pellet granulate at a bulk density of approximately 250 kg/m$^3$, a residual moisture of less than 9% and a fine component of less than 2% and then further processed in the extruder.

6.
20 weight-% of thermoplastic polyurethane with an MFI value of 1-25 g/10 min. measured at 150° C., 10 kg, 10 weight-% of linear polyester polyepsilon caprolacton with a molecular weight distribution of 40 to 80,000 are pre-agglomerated with 65 weight-% of straw pellet granulate at a bulk density of approximately 250 kg/m$^3$, a residual moisture of less than 9% and a fine component of less than 2% and then further processed in the extruder.

7.
20 weight-% of thermoplastic polyurethane with an MFI value of 1-25 g/10 min. measured at 150° C., 10 kg, 10 weight-% of linear polyester polyepsilon caprolacton with a molecular weight distribution of 40 to 80,000 are pre-agglomerated with 65 weight-% of fibre filling materials consisting of 45 weight-% of straw fibres and 20 weight-% of straw granulate and then further processed in the extruder.

The comparable experiments V1 through V3 are carried out at 40, 50 and 60 weight % of wood powder.

V1:
35 weight-% of thermoplastic polyurethane with an MFI value of 1-25 g/10 min. measured at 150° C., 10 kg, 10 weight-% of ethylene vinyl acetate copolymer at a VA content of 20-40 weight-% and 15 weight-% of linear polyester polyepsilon caprolacton with a molecular weight distribution of 40 to 80,000 are pre-agglomerated with 40 weight-% of wood powder and then further processed in the extruder.

V2:
10 weight-% of ethylene vinyl acetate copolymer at a VA content of 20-40 weight-% and 40 weight-% of linear polyester polyepsilon caprolacton with a molecular weight distribution of 40 to 80,000 are pre-agglomerated with 50 weight-% of wood powder and then further processed in the extruder.

V3:
20 weight-% of ethylene vinyl acetate copolymer at a VA content of 20-40 weight-% and 20 weight-% of linear polyester polyepsilon caprolacton with a molecular weight distribution of 40 to 80,000 are pre-agglomerated with 60 weight-% of wood powder and then further processed in the extruder.

TABLE 1

| experiment unit | bending stiffness [mN] | adhesion 13 sec/ 150° C./6 bar | resistance to tear propagation [N] | stitch point tear-out resistance [N] |
| --- | --- | --- | --- | --- |
| 1 | 1182 | 80 | 11.3 | 27 |
| 2 | 1663 | 68 | 7 | 24.1 |
| 3 | 1310 | 68 | 10.6 | 32.2 |
| 4 | 1181 | 44 | 6.3 | 16.4 |
| 5 | 1354 | 12 | ? | ? |
| 6 | 1892 | 91 | 8.8 | 22.5 |
| 7 | 2016 | 57 | 7.2 | 36.2 |

The invention claimed is:
1. A method for producing thermoplastic stiffening materials for the shoe industry in the form of a hot-melt adhesive/plastic compound, comprising:

pre-agglomerating a plant fibre filling material and a thermoplastic hot-melt adhesive through friction heat below the melting point of the hot-melt adhesive to form the hot-melt adhesive/plastic compound, and further processing the compound on a calender or extruder into flat sheets/flat foils, wherein the plant fibre filling material are regenerative organic plant fibres made of straw, wherein the compound has a proportion of plant fibre filling material 1-30 mm long and in a quantity of as much as 65 weight-% based on total composition weight where the compound has a bending strength of 1000-2500 N measured in conformity with DIN 53121.

2. The method according to claim 1, characterized by the fact that the thermoplastic hot-melt adhesive are selected from linear polyesters, polycaprolactone, ethylene vinyl acetate copolymers, HDPE, polyethylenes, thermoplastic polyurethanes, polypropylenes or mixtures of these plastics.

3. The method according to claim 1, characterized by the fact that the plant fibre filling material are used in the pre-agglomerated form with fibres 1-30 mm long.

4. The method according to claim 1, further comprising pre-agglomerating up to 1 weight-% inorganic filling materials based on total composition weight.

5. The method according to claim 1, further comprising melting the pre-agglomerate consisting of the plant fibres and thermoplastic hot-melt adhesive in a kneader and forming into flat tracks/flat foils on a calender or extruder.

6. The method according to claim 1 wherein the plant fibre filling material is 3-10 mm long.

7. The method according to claim 1, further comprising manufacturing a shoe, wherein the shoe includes the thermoplastic stiffening material.

* * * * *